United States Patent [19]

Hirata et al.

[11] Patent Number: 4,839,827

[45] Date of Patent: Jun. 13, 1989

[54] DOCUMENT PROCESSING APPARATUS

[75] Inventors: Keiiti Hirata, Kuwana; Yoshinari Morimoto, Nagoya; Tomohiro Ban, Iwakura; Tokihito Furushima; Tomoko Miura, both of Nagoya; Yoshie Ikeda, Nagoya, all of Japan

[73] Assignee: Brother Kogyo Kabushiki Kaisha, Aichi, Japan

[21] Appl. No.: 73,015

[22] Filed: Jul. 14, 1987

[30] Foreign Application Priority Data

Jul. 15, 1986 [JP] Japan .................................. 61-167098

[51] Int. Cl.$^4$ ................................................ G06F 3/14
[52] U.S. Cl. ...................................... 364/518; 400/83; 400/63
[58] Field of Search ..................... 364/518; 400/83, 64, 400/63, 70, 279

[56] References Cited

U.S. PATENT DOCUMENTS

| | | | |
|---|---|---|---|
| 1,528,560 | 7/1985 | Bergermann et al. | 340/709 |
| 4,240,758 | 12/1980 | Acosta | 400/279 |
| 4,244,031 | 1/1981 | Izushima et al. | 364/900 |
| 4,504,825 | 3/1985 | Bergermann et al. | 340/709 |
| 4,564,304 | 1/1986 | Ueno | 400/279 |
| 4,646,250 | 2/1987 | Childress | 364/518 |
| 4,742,485 | 5/1988 | Carlson et al. | 364/900 |
| 4,749,289 | 6/1988 | Sugiura et al. | 400/17 |
| 4,751,669 | 6/1988 | Sturgis et al. | 364/900 |
| 4,751,674 | 6/1988 | Aoyagi et al. | 364/900 |
| 4,789,255 | 12/1988 | Hays et al. | 400/63 |

OTHER PUBLICATIONS

IBM Technical Disclosure Bulletin "Enhanced Word Processing Access to Documents", vol. 30, No. 9, 2/88, pp. 6-7.
IBM Technical Disclosure Bulletin, "Line, Point, and Tab Alignment", vol. 25, No. 1, 6/82, pp. 213-215.

Primary Examiner—Gary V. Harkcom
Assistant Examiner—Phu K. Nguyen
Attorney, Agent, or Firm—Kane, Dalsimer, Sullivan, Kurucz, Levy, Eisele and Richard

[57] ABSTRACT

In a document processing apparatus, the top position of the input data visually displayed on a display unit is displaced toward the end of the line and the corresponding control code mark is represented before the top position of the input data when a control code therefor is input. The apparatus is provided with a shift inhibit for adding space codes in the corresponding area of the input data buffer so that format is not changed despite rewrite of the control code, and a shift permit for displacement of the top position after erasure of said control code mark by the erase signal. Thereby, deformatting is prevented and the document processing is easily carried out.

9 Claims, 6 Drawing Sheets

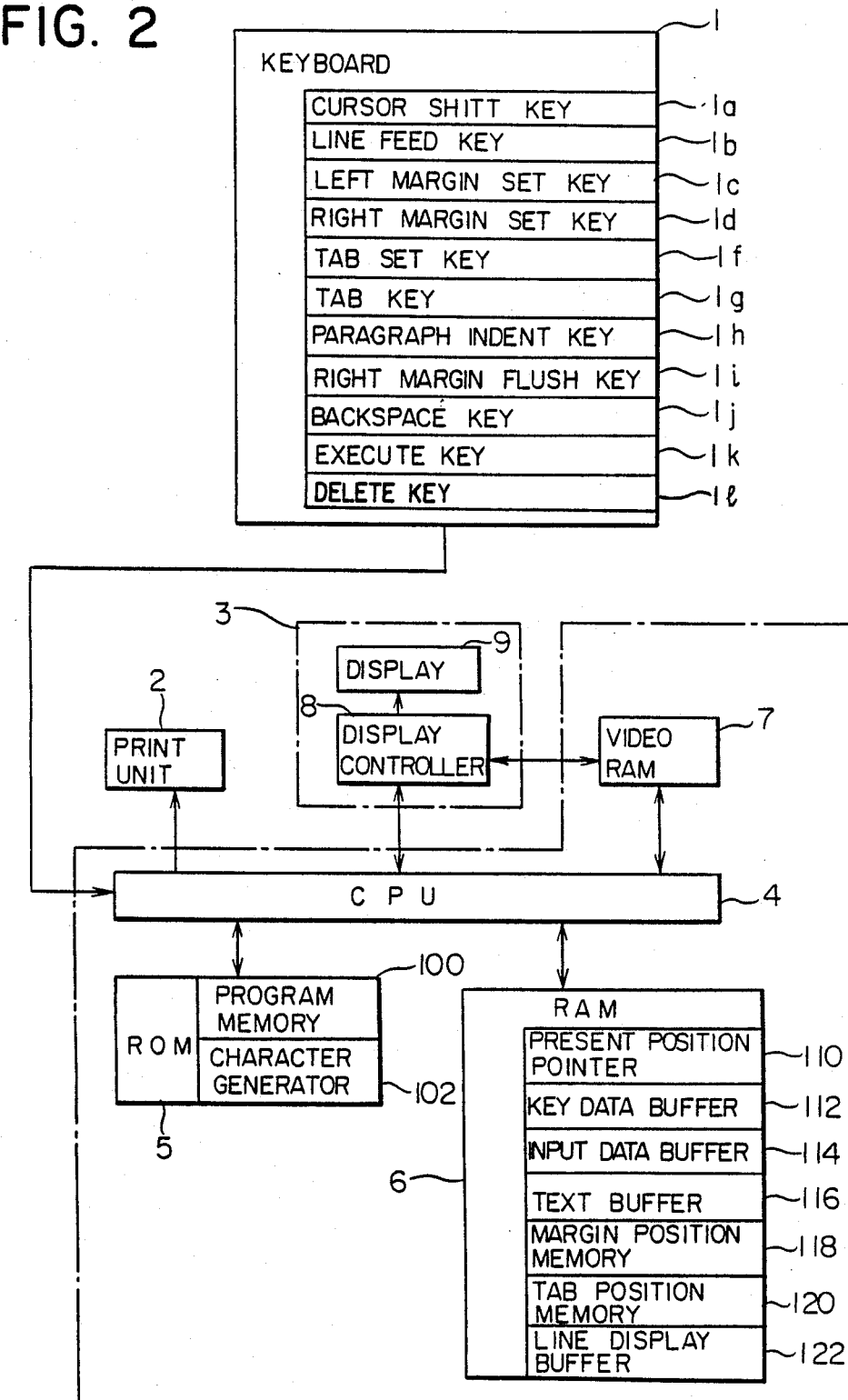

DOCUMENT PROCESSING APPARATUS

BACKGROUND OF THE INVENTION

The present invention relates to a document processing apparatus and, more particularly, to improvements in its editing function with regard to tabulation, paragraph indent, centering, right margin flush and so forth.

The document processing apparatus generally called "word processor" is so designed as to input a document while visually representing the input data on a display, and it is provided with a variety of editing functions for production of document.

Out of such editing functions, a tab function is used for arranging a character or symbol at a predetermined tab position on a display as required per line; a paragraph indent function is used for arranging the top of a paragraph of plural lines at a tab position; and a right margin flush function is used for arranging the end of each line of characters and symbols at a right margin position as required per line.

FIG. 10 (A) illustrates data represented visually on a display with the top of a paragraph of plural lines arranged at a tab position by the paragraph indent function in a conventional word processor, wherein there are shown a left margin 10, a right margin 11, a tab mark 12, and a control code mark 15 for paragraph indent. In the case of displaying a control code mark 15 as in FIG. 10 (A), code data corresponding to the mark to be represented visually on the display is stored in an input data buffer incorporated in a RAM (random access memory) of a controller. It is also customary to execute control of tabulation and right margin flush functions.

FIG. 11 shows the screen of a display where the top of a row of characters is set at a tab position by a tab function in a conventional apparatus, in which a control code mark denoting the tab function is not represented, and space codes 14 are existent in a region extending from a left margin 10 to a tab position denoted by a tab mark 12. Actually, however, the space codes 14 are not displayed visually on the screen. In the case of FIG. 11, the space codes 14 corresponding to the data to be displayed and the character code for ABCDE are also stored in the input data buffer. Such control is similarly executed with respect to functions of paragraph indent and right margin flush as well.

When a character such as "X" is input by superposition on the control code mark 15 after the document is edited by the paragraph indent function as shown in FIG. 10 (A), the control code data is replaced in the input data buffer with code data of the character "X", so that the code data representing the paragraph indent is erased with respect to the 1st line and consequently the paragraph indent function is canceled at the moment of inputting the code data of the character "X" as shown in FIG. 10 (B), whereby the top of the character row XABCD . . . is shifted to the left margin 10 while the 2nd character row is rendered continuous with the 1st character row, and further the 3rd character row is rendered continuous with the 2nd character row to eventually bring about disorder of the format. Accordingly, for avoiding any change in the format from the 1st line though the 3rd line, it becomes necessary to perform an intricate operation which, as shown in FIG. 10 (C), inputs a plurality of space codes 14 in the 1st line from the left margin 10 to the character "X" and also in the 2nd and 3rd lines from the left margin 10 to the tab position denoted by a tab mark 12.

Besides the above, since the control code mark 15 is not displayed at all, discrimination between the presence and absence of the paragraph indent function is indistinct so that there may arise a problem of erroneous operation in readiting the document with correction and deletion of words.

In comparison therewith, when displaying space codes 14 as shown in FIG. 11 or storing them in the input buffer without displaying or storing the control code, the format is not changed by replacement of any space code 14 with character or symbol code data. However, when canceling any function such as tabulation, paragraph indent or right margin flush, a multiplicity of space codes 14 need to be erased in sequence to consequently intricate the operation.

SUMMARY OF THE INVENTION

Accordingly, it is an object of the present invention is to provide a document processing apparatus so contrived as to display the aforeside control code mark while eliminating occurrence of any change in the format even when inputting a character or symbol by superposition on the control code mark and is capable of canceling any of tabulation, paragraph indent, simplified operation of erasing the control code mark.

The document processing apparatus of the present invention comprises, as shown in a function block diagram of FIG. 1, a keyboard provided with at least character-symbol keys for inputting data of characters and symbols, and an erase key for inputting a signal to erase the input data; a visual display means including a display to visually represent the input data from the keyboard; a buffer for storing the input data; a shift means for displacing the top position of the input data on the display toward the end of the line; a control code displaying control means for displaying a control code mark in the line where the data is existent, the code mark denoting the top position renewed by the shift means; a shift inhibit means for displaying a character or symbol instead of the control code mark when the character or symbol is input to the display position of the control code mark, and inhibiting shift of the data displaced toward the end of the line by the shift means; and a shift permit means for permitting displacement of the top position by the shift means after erasure of the control code mark by the erase signal.

In the document processing apparatus of the present invention, code data of characters and symbols input from the keyboard are stored sequentially in the buffer and the represented visually on the display of the visual display means.

The top position of the input data represented visually on the display can be displaced toward the line end by the shift means. And in response to displacement of the input data toward the line end by the shift means as mentioned, a control code mark denoting the top position of the input data is represented visually by the control code displaying control means.

If any character or symbol is input to the position of the control code mark being represented visually, then such character or symbol is displayed instead of the control code mark by the shift inhibit means, and simultaneously the shift of the data displaced toward the line end is inhibited so that the format is maintained.

And after the control code mark is erased by an erase signal inputted by actuating the erase key on the keyboard, displacement of the top position by the shift means is permitted by the shift permit means so that the input data is shifted to the line top.

DESCRIPTION OF THE ACCOMPANYING DRAWINGS

FIG. 2 is a block diagram of an English word processor embodying the invention;

Figure 1:
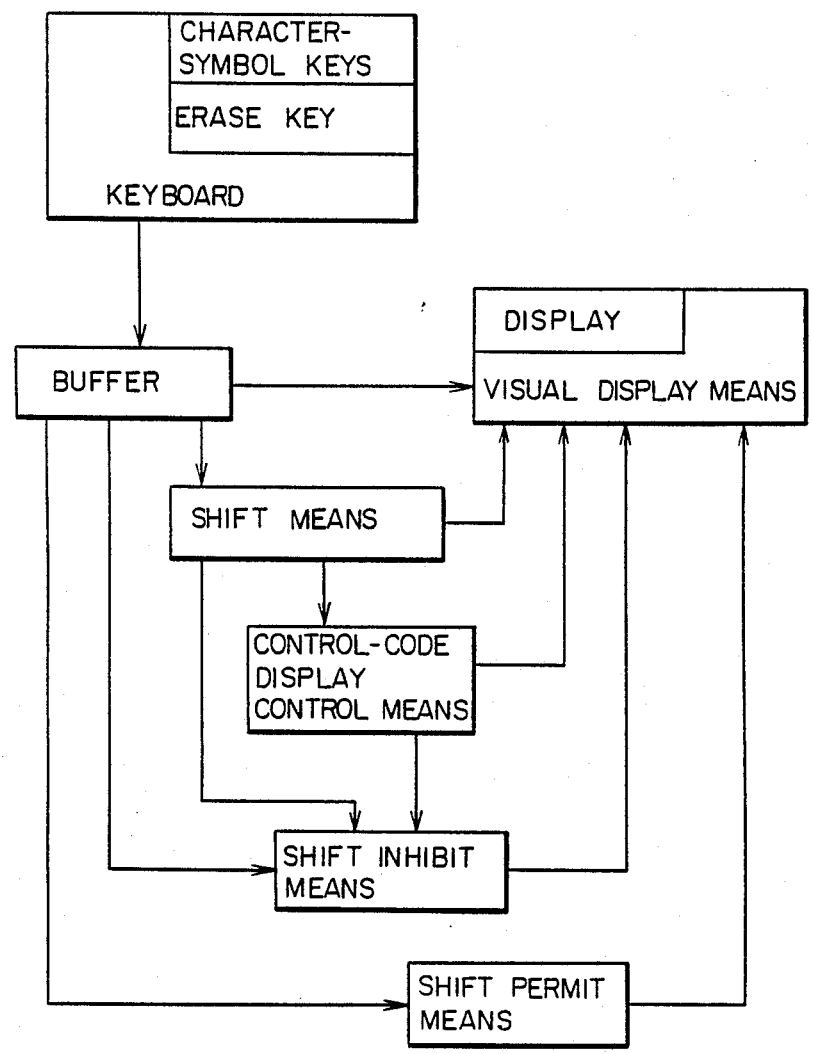
FIG. 1 is a function block diagram of the present invention.
Figure 3A:
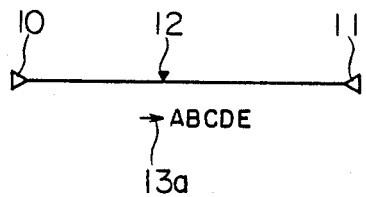
Figure 3B:
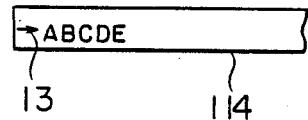
Figure 4A:
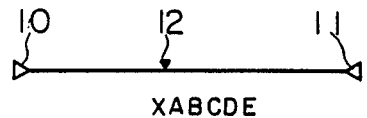
Figure 4B:
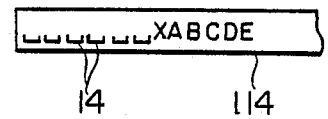
Figure 5A:
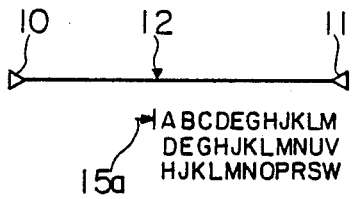
Figure 5B:
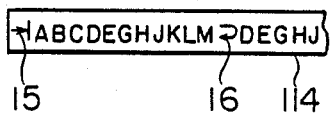
Figure 6A:
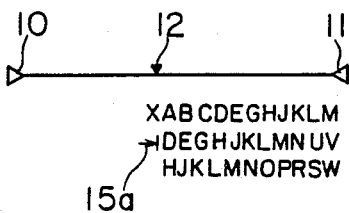
Figure 6B:
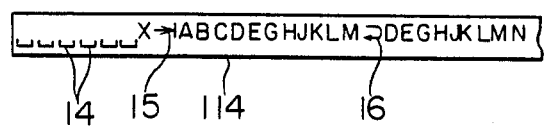
Figure 6C:
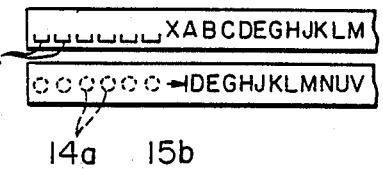
Figure 6D:
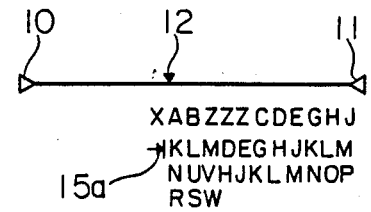
Figure 6E:
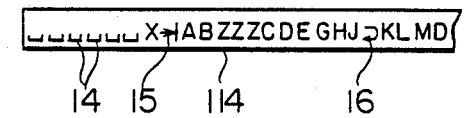
Figure 7A:
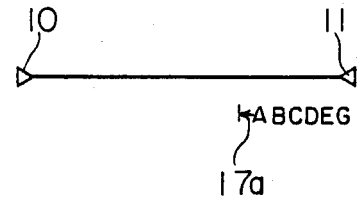
Figure 7B:
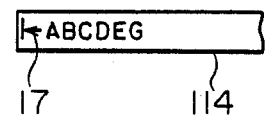
Figure 8A:
Figure 8B:
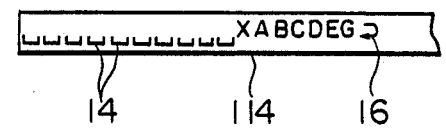
Figure 9:
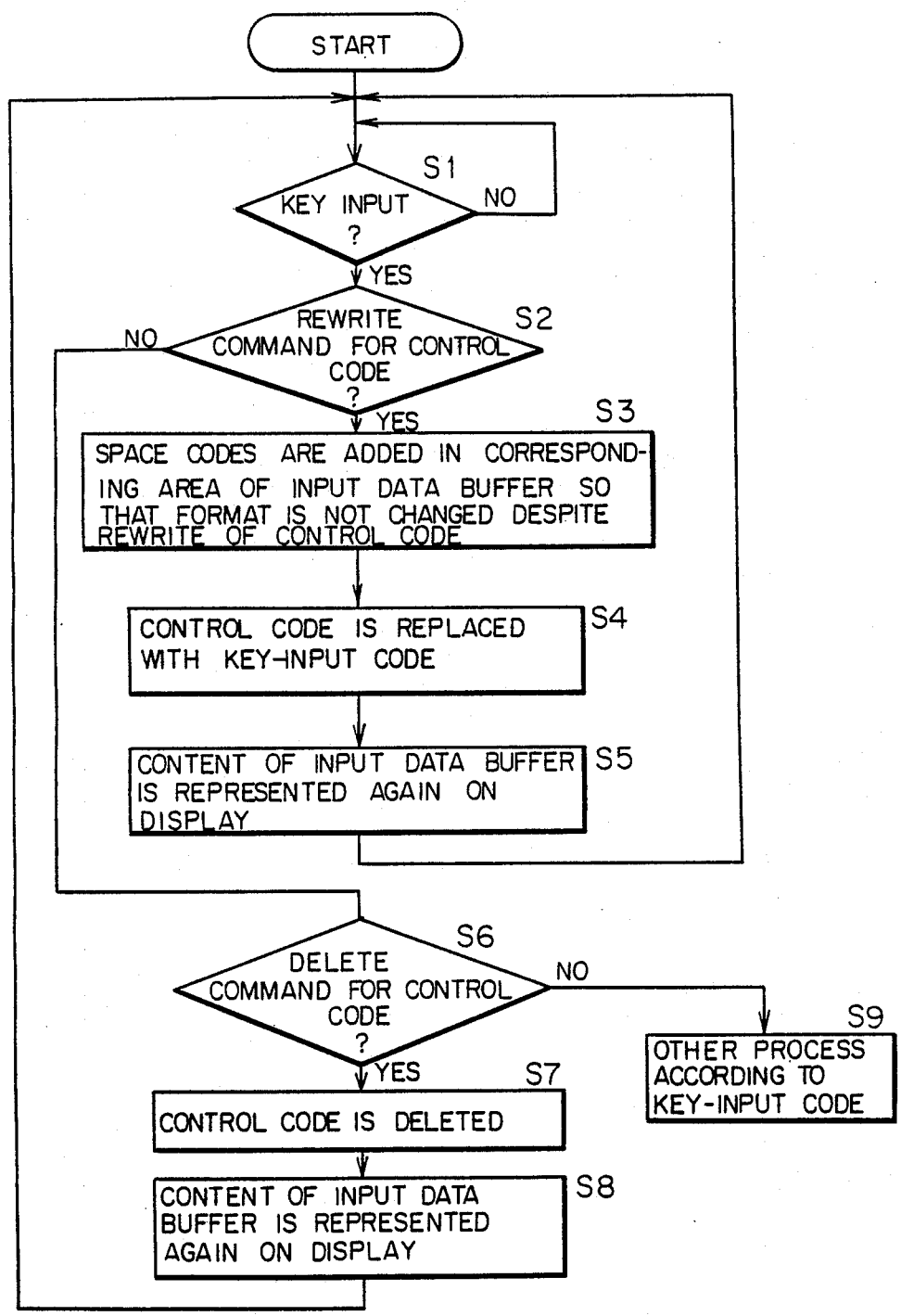
Figure 10A:
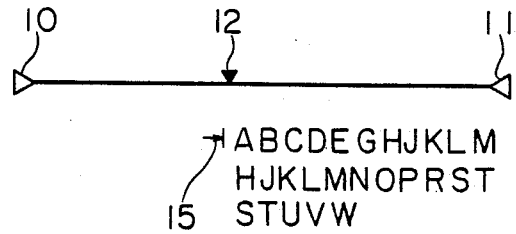
Figure 10B:
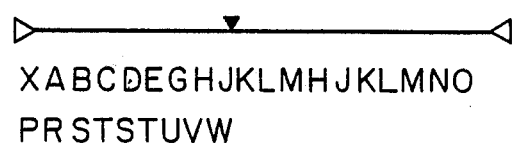
Figure 10C:
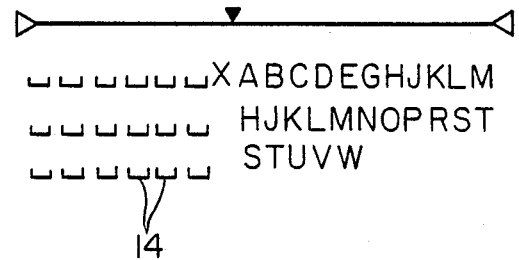
Figure 11:
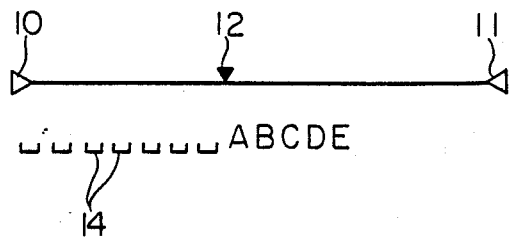

FIGS. 3 (A) and (B) illustrate the data represented on a display and the content of an input data buffer obtained respectively by the use of a tab function;

FIGS. 4 (A) and (B) correspond respectively to FIGS. 3 (A) and (B) with a tab code replaced by a character X;

FIGS. 5 (A) and (B) illustrate the data represented on the display and the content of the input data buffer obtained respectively by the use of a paragraph indent function;

FIGS. 6 (A) and (B) correspond respectively to FIGS. 5 (A) and (B) with a paragraph indent code replace by a character X;

FIG. 6 (C) illustrates the data of a line display buffer;

FIGS. 6 (D) and (E) correspond respectively to FIGS. 5 (A) and (B) with a character row ZZZ inserted in the state of FIG. 6 (A);

FIGS. 7 (A) and (B) illustrate the data represented on the display and the content of the input data buffer obtained respectively by the use of a right margin flush function;

FIGS. 8 (A) and (B) correspond respectively to FIGS. 7 (A) and (B) with a right margin flush code replaced by a character X;

FIGS. 9 is a flow chart of control routines for replacement and deletion of the control code mark;

FIGS. 10 and 11 relate to the prior art, in which FIGS. 10 (A), (B) and (C) respectively illustrate the data represented on the display by the use of a paragraph indent function, and FIG. 11 illustrates the data represented on the display by the use of a tab function.

DESCRIPTION OF THE PREFERRED EMBODIMENT

Hereinafter the present invention will be described with reference to an exemplary embodiment thereof applied to an English word processor and shown in the accompanying drawings.

The English word processor basically comprises a keyboard 1, a print unit 2, a display unit 3 and a control unit C, as shown in FIG. 2.

The keyboard 1 is provided with the following alphanumeric keys and function keys.

The alphanumeric keys include alphabet keys, numeral keys and various symbol keys.

The function keys include a cursor shift key $1a$ for vertically and horizontally shifting a cursor on a display 9 in the visual display unit; line feed key $1b$ for instructing line feed; a left margin set key $1c$ and a right margin set key $1d$ for setting left and right margin for setting a tab position on the display 9; a tab set key $1f$ for setting a tab position on the display 9; a tab key $1g$ for instructing shift of the cursor to the tab position; a paragraph indent key $1h$ for outputting an instruction to arrange the line tops of a paragraph of a plural lines at the tab position on the display; a right margin flush key $1i$ for outputting an instruction to arrange the line ends at a right margin position on the display 9; a delete key $1l$ for instructing deletion of character and symbol data with other code data and outputting an erase signal; backspace key $1j$ for shifting the cursor leftward with deleting the data correspond to the cursor; a search key for searching a character row instructed with respect to the data in a text memory; a replace key for replacing the cursor-indicated character row with a designated character row; a copy key for copying the cursor-indicated character row at a designated position; a move key for moving the characters and symbols within the cursor indicated range to designated position; an execute key $1k$ for instructing execution of the editing function by the actuated function key such as the aforesaid delete key $1l$, search key, replace key, copy key or move key; and an end key for instructing the end of inputting and editing the document.

In addition to the above, the keyboard 1 is further provided with an operation command key, a code key and various function keys as in any ordinary English word processor. However, an explanation on such keys is omitted here since they are not related directly to the feature of the present invention.

The print unit 2 comprises a mechanism with a carriage, a motor for actuating such mechanism, a circuit for driving the motor, a mechanism for feeding print paper, a motor for actuating such mechanism, a circuit for driving the motor, a print wheel, a wheel actuating motor, a circuit for driving the motor, a print hammer, a hammer actuating solenoid, and a circuit for driving the solenoid.

The visual display unit 3 consists of a known configuration including a display 9 composed of a CRT and a display controller 8 for outputting drive signal to the display 9.

The control unit C provided for controlling both the print unit 2 and the visual display unit 3 comprises a CPU (central processing unit) 4, a ROM (read only memory) 5, a RAM (random access memory) 6 and a video RAM 7. To the CPU 4 are connected the keyboard 1, driving circuits in the print unit 2, display controller 8 in the visual display unit 3, ROM 5, RAM 6, and video RAM 7.

In a program memory 100 of the ROM 5, there are previously stored a control program for key-scanning the data inputted from the keyboard 1; a program for controlling the print unit 2 and the visual display unit 3 in accordance with the code data read out from a text buffer 116 in the RAM 6; a program for controlling the video RAM 7 in accordance with the code data inputted from the keyboard 1 or the data from the text buffer 116;g a program for controlling the tab, paragraph indent and right margin flush functions; a control program for displaying an undermentioned control code mark; and a program for controlling replacement and erasure of a control code which will be described later with reference to a flow chart.

In a character generator 102 of the ROM5, there is stored pattern data which correspond to code data for visually representing characters and symbols on the display 9 in accordance with the character and symbol code data.

The video RAM 7 has a memory of a capacity equivalent to one picture represented on the display 9 and receives the code data of characters and symbols to be represented on the display 9 and also other code data from the input data buffer 114 of the RAM 6. Subsequently the video RAM 7 stores such code data correspondingly to the individual display positions and feeds the data to the display controller 8. This video RAM 7 consists also of a known configuration.

The RAM 6 comprises at least a present position pointer 110 for storing the present position of the cursor on the display 9; a key data buffer 112 for temporarily storing code data of several characters inputted from the keyboard 1; an input data buffer 114 for sequentially storing code data of several ten characters inputted from the keyboard 1; a text buffer 116 for receiving data from the input data buffer 114 and storing the data as a text file; a margin position memory 118 for storing left and right margin position set on the display 9; and a tab position memory 120 for storing one or more tab positions set on the display 9.

The CPU 4 enables the text buffer 116 of the RAM 6 to sequentially store therein code data corresponding to characters and symbols such as alphabets, numerals and symbols inputted from the alphanumeric keys on the keyboard 1, then sequentially reads out from the character generator 102 of the ROM 5 pattern data which correspond to such code data respectively, and feeds such pattern data to the display controller 8.

The CPU 4 further processes the input code data from each of the function keys on the keyboard 1 by the control program read out from the program memory 100 of the ROM 5 and thereby outputs a control signal, which corresponds to the input code data, to each driving circuit of the print unit 2.

In order to facilitate comprehension of the flow chart of control routines used in the document processing apparatus of the present invention, a description will be given below, with reference to FIGS. 3 through 8, on the summary of control-code display control and replacement control in this embodiment.

FIGS. 3 and 4 relates to the tab function. For setting a tab position, the tab set key is depressed after placing the cursor at a desired tab position, so that the tab position thus set is stored in the tab position memory 120 with the tab 12 displayed at the tab position. In execution of the tab function, the tab key is depressed to automatically shift the cursor toward the line end (rightward) down to the first tab position in accordance with the data obtained from the present position pointer 110 and the tab position memory 120, whereby a tab code mark 13a is visually represented at the display position having a leftward deviation of one character from the tab position.

With regard to setting of the tab position, visual representation of the tab 12, execution of the tab function and visual representation of the tab code mark 13a, the same control is performed as in the known apparatus.

FIG. 3 (A) shows visual representation on the display 9 including a left margin 10, a tab 12 set via the tab set key, a right margin 11, a tab code mark 13a (one of control codes) of the input tab function, and a character row ABCDE of input data. And FIG. 3 (B) shows the content of the input data buffer 114, in which a reference numeral 13 denotes a tab code.

As shown in FIG. 4 (A), when a character X for example is inputted by superposition on the tab code mark 13a, and control is so performed that space codes 14 are inputted automatically in a region from the left margin 10 to the character X with the same pitch as the character row XABCDE so as not to bring about any change in the format, whereby the data in the input data buffer is rewritten as shown in FIG. 4 (B).

The number of space codes 14 added as mentioned is calculated on the basis of the left margin position data, the data of the present position pointer 110, and the pitch of the displayed characters. However, the number of such space codes may be calculated on the basis of the data in the video RAM 7.

When canceling the tab function, first the cursor is placed at the position of the tab code mark 13 and the delete key 1i is depressed to generate an erase signal, which then serves to erase the tab code 13a of the input data buffer 114 so that the top of the character row ABCDE is rendered coincident with the left margin 10.

FIGS. 5 and 6 relate to the paragraph indent function. In execution of the paragraph indent function with the tab 12 preset as in the foregoing case, the paragraph indent key 1g is depressed to automatically shift the cursor right ward to the first tab position as mentioned previously, whereby a paragraph indent code mark 15a is displayed at a position having a leftward deviation of one character from the tab position. And each time the line is renewed by depressing the line feed key 1b, the cursor is returned to the tab position indicated by the paragraph indent code.

With regard to execution of the paragraph indent function and visual representation of the paragraph indent code mark 15a, the same control is performed as in the known apparatus.

FIG. 5 (A) shows visual representation on the display 9 including a left margin 10, a tab 12, a right margin 11, a paragraph indent code mark 15a (one of control code marks), and a paragraph of three character rows. Meanwhile FIG. 5 (B) shows the content of the input data buffer 114 with a paragraph indent code 15 and a soft feed line code 16 inserted automatically by the control unit C in response to arrival of the character row of input data at the right margin.

In the state of FIG. 5 (A), when a character X for example is inputted by superposition on the paragraph indent code mark 15 as illustrated in FIG. 6 (A), then the character X is displayed instead of the paragraph indent code mark 15a, and control is so performed that the code of the character X is added anterior o the paragraph indent code 15 in the input buffer so as not to bring about any change in the format. And subsequently space codes 14 are inputted automatically in a region from the left margin 10 to the character X with the same pitch as the character row XABCD . . . , whereby the data in the input data buffer 114 is rewritten as shown in FIG. 6 (B).

The upper half of FIG. 6 (C) shows the content of the line display buffer 122 when the cursor is on the 1st line , and the lower half of FIG. 6 (C) shows the content of the line display buffer when the cursor is on the 2nd line, wherein there are also represented space codes 14, null data 14a and paragraph indent code mark data 15b.

If the cursor on the display 9 is shifted to another line, the data of the line display buffer relative to the preceding line where the cursor has been existent is written in the input data buffer 114 together with the control data (paragraph indent code, soft line feed code and so forth). At the time of storage in the input data buffer 114, the null data 14a is rendered invalid and not stored.

When canceling the paragraph indent function, the paragraph indent code mark 15a on the display 9 is erased so that the code data 15b and 15 of both the line display buffer and the input data buffer 114 are also erased.

FIG. 6 (D) shows the data on the display 9 obtained when a character row ZZZ is inserted between the characters B and C in the state of FIG. 6 (A); and FIG.

6 (E) shows the content of the input data buffer 114 corresponding thereto, in which a reference numeral 15 denotes code data for the paragraph indent function.

FIGS. 7 and 8 relate to the right margin flush function. In execution of the right margin flush function, the right margin flush key 1h is depressed after inputting the data of plural characters and symbols of the line, whereby the input data is so shifted that the end thereof becomes coincident with the right margin, and a right margin flush code mark 17a is visually represented at the top of the input data. Shift of the data and visual representation of the right margin flush code mark by this right flush function are the same as those in the known apparatus.

FIG. 7 (A) shows a left margin 10, a right margin 11, a right margin flush code mark 17a (one of control code marks) and a character row ABCDEG represented visually on the display 9. And FIG. 7 (B) shows the content of the input data buffer 114, wherein a reference numeral 17 denotes a right margin flush code. Similarly to the foregoing examples, FIG. 8 (A) shows a state where a character X is inputted by superposition on the right margin flush code mark 17a; and FIG. 8 (B) shows the content of the input data buffer 114 in which space codes 14 are automatically written in a region from the left margin 10 to the character X. In this case, the number of space codes 14 automatically written is calculated on the basis of the left margin position data, the right margin position data, the character pitch and the number of characters in the row XABCDEG. However, such calculation may be executed on the basis of the data in the video RAM 7.

As is obvious from the above description, controlled display of the control code mark is so performed that, when control codes such as tab code 13, paragraph indent code 15 and right margin flush code 17 are inputted, the code data are stored in the input data buffer 114 (or in the text buffer 116 after transfer thereto), and control code marks 13a, 15a, 17a corresponding to such control codes are displayed at the top of the character row represented visually on the display 9.

On condition that a character row is visually represented on the display 9 as shown in FIG. 3, 5 or 7 from any point of a line other than the left margin by the tab function, paragraph indent function or right margin flush function, a description will be given with reference to the flow chart of FIG. 9 about control routines for control-code mark replacement and erasure executed when a character or symbol is inputted by superposition on the aforesaid control code mark 13a, 15a, 17a.

Upon start of the control, the presence or absence of any key input is decided in step S1 (hereinafter referred to simply as S1, and other steps mentioned similarly). If the result of such decision is No, the procedure returns to S1. Meanwhile in the case of Yes, the procedure advances to S2 where a decision is made as to whether the input is a rewrite command for the control code 13, 15, 17. In this decision, the present position pointer 110 indicates the positions of control code marks 13a, 15a, 17a and, if the input is from any alphanumeric key, it is regarded as a rewrite command for the control code. Then the procedure advances to S3 in the case of rewriting the control code 13, 15, 17 or to S6 in the case of no rewrite.

In S3, space codes 14 are added in the corresponding area of the input data buffer 114 so that the format is not changed despite rewrite of the control code 13, 15, 17.

Next in S4, the control code 13, 15, 17 is replaced with the key-input code temporarily stored in the key data buffer 112. Subsequently in S5, the content of the input data buffer 114 is visually represented on the display 9, and then the procedure returns from S5 to S1.

If the result in S2 is No relative to rewrite of the control code 13, 15, 17, a decision is executed in S6 as to whether the input is a delete command for the control code 13, 15, 17. In this case, the key input is decided to be a delete command for the control code 13, 15, 17 on condition that the present position pointer 110 is indicating the position of control code 13, 15, 17 and the key depressed in S1 is a delete key 1i or a backspace key 1j.

In case the input is decided to be a command to delete the control code 13, 15, 17, then the procedure advances from S6 to S7 where the control code 13, 15, 17 is deleted. Upon such deletion, the character row on that line comes to be positionally coincident with the left margin 10. Subsequently in S8, the content of the input data buffer 114 is represented again on the display 9, and the procedure returns to S1 from S8.

As described hereinabove, the input is judged to be a rewrite command or a delete command for the control code 13, 15, 17. And in the former case, space codes 14 are added in the corresponding area of the input data buffer 114 so as not to bring about any change in the format;: while in the latter case of a delete command, the control code 13, 15, 17 is deleted. Thus, the format is maintained despite replacement of any control code 13, 15, 17 with a character or symbol code, and the function for the control code 13, 15, 17 can be canceled with simple deletion of such control code via the delete key 1i or the backspace key 1j.

When the paragraph indent code mark 15a on the 1st line has been rewritten as shown in FIG. 6 (A), a visual representation of the mark 15a at the top of the 2nd-line character row distinctly indicates use of the paragraph indent function to consequently prevent erroneous operation.

According to the document processing apparatus of the present invention, as described hereinabove, any change in the format can be prevented, when replacing the control code mark with a character or symbol, by inhibiting shift of the data which is executed by the shift inhibit means and, at the time to change the format, displacement of the top position is permissible with facility by erasing the control code mark by the use of an erase signal obtained from the erase key.

Since rewriting or erasing the control code mark can thus be performed with facility, it becomes possible to enhance the document processing efficiency to consequently achieve remarkable convenience in operating the apparatus.

What is claimed is:

1. A document processing apparatus comprising a keyboard provided with at least character-symbol keys for inputting data of characters and symbols and an erase key for inputting a signal to erase the input data, a visual display means including a display to visually represent the input data from said keyboard, a buffer for storing the input data, a shift means for displacing the top position of the input data on the display toward the end of the line, and a control code displaying means for displaying a control code mark in the line where the data is existent, said code mark denoting the top position renewed by said shift means, the improvement which comprises by a shift inhibit means for displaying a character or symbol instead of the control code mark when said character or symbol is input to the display position of said control code mark and inhibiting shift of the data displaced toward the end of the line by said shift means; and a shift permit means for permitting displacement of the top position by said shift means after erasure of said control code mark by said erase signal.

2. The apparatus according to claim 1 which further comprises means for judging whether the input data is rewrite command for the control code.

3. The apparatus according to claim 1 wherein said shift inhibit means includes means for adding space codes in the corresponding area of said buffer so that the format is not changed despite rewrite of the control code.

4. The apparatus according to claim 3 which further comprises means for replacing a control code with a key-input code after the addition of space codes by said means for adding space codes.

5. The apparatus according to claim 3 which further comprises means for calculating numbers of said space codes to be added.

6. The apparatus according to claim 1 wherein said control code is a paragraph indent code, and which further comprises means for adding a paragraph indent code mark at the same column of the line next to the line where the paragraph indent code mark has been preceding represented, when said paragraph indent code mark is replaced with a character or a symbol, so as to distinctly indicate use of the paragraph indent function to consequently prevent erroneous operation.

7. The apparatus according to claim 1 wherein said shift permit means includes means for judging whether the input data is a command to delete the control code.

8. The apparatus according to claim 7 wherein said judging means determines if the input is a command to delete the control code when said erase key is operated.

9. The apparatus according to claim 1 wherein said code mark is at least one of tab mark, paragraph indent mark centering mark and right margin flush mark.

* * * * *